June 3, 1941.  L. POLONEC ET AL  2,244,116
COMBINED BRAKE AND ACCELERATOR CONTROLLING MEANS FOR AUTOMOTIVE VEHICLES
Filed Nov. 7, 1939  3 Sheets-Sheet 1

Inventors
Lubo Polonec
and Anders K. Andersen
BY
Parker, Carlson, Pitzner & Hubbard
Attorneys.

June 3, 1941.　　L. POLONEC ET AL　　2,244,116
COMBINED BRAKE AND ACCELERATOR CONTROLLING MEANS FOR AUTOMOTIVE VEHICLES
Filed Nov. 7, 1939　　3 Sheets-Sheet 2
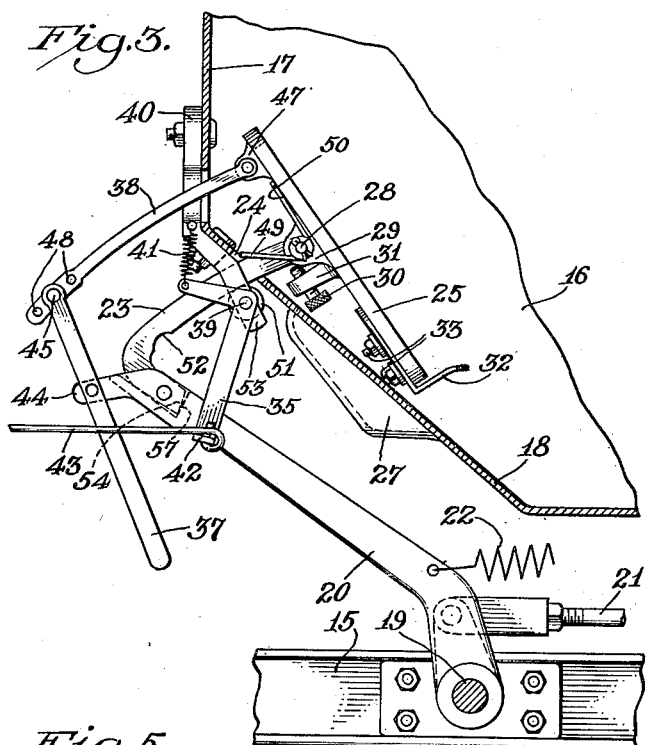
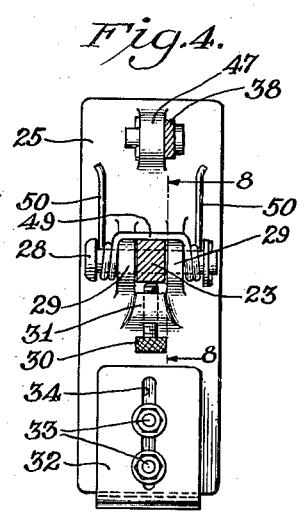
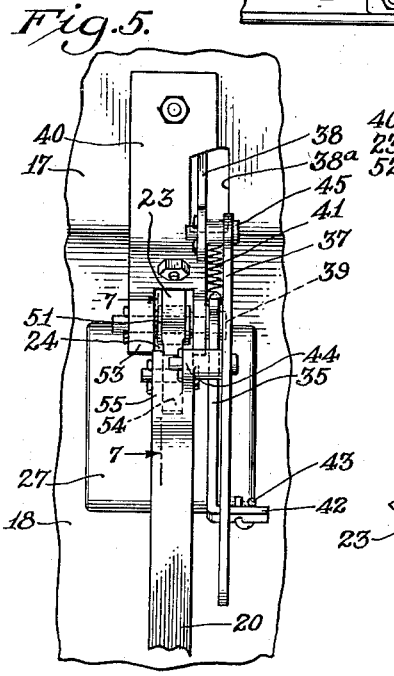
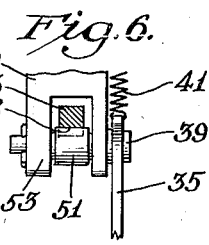
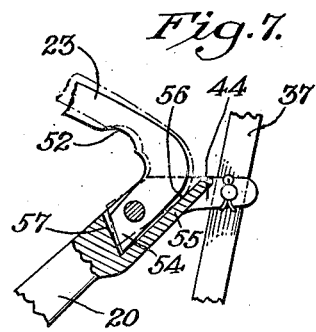
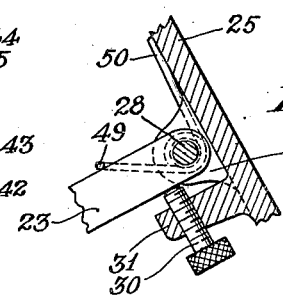
Inventors
Lubo Polonec
and Anders K. Andersen
BY
Parker, Carlson, Pitzner & Hubbard
Attorneys.

June 3, 1941.  L. POLONEC ET AL  2,244,116
COMBINED BRAKE AND ACCELERATOR CONTROLLING MEANS FOR AUTOMOTIVE VEHICLES
Filed Nov. 7, 1939  3 Sheets-Sheet 3
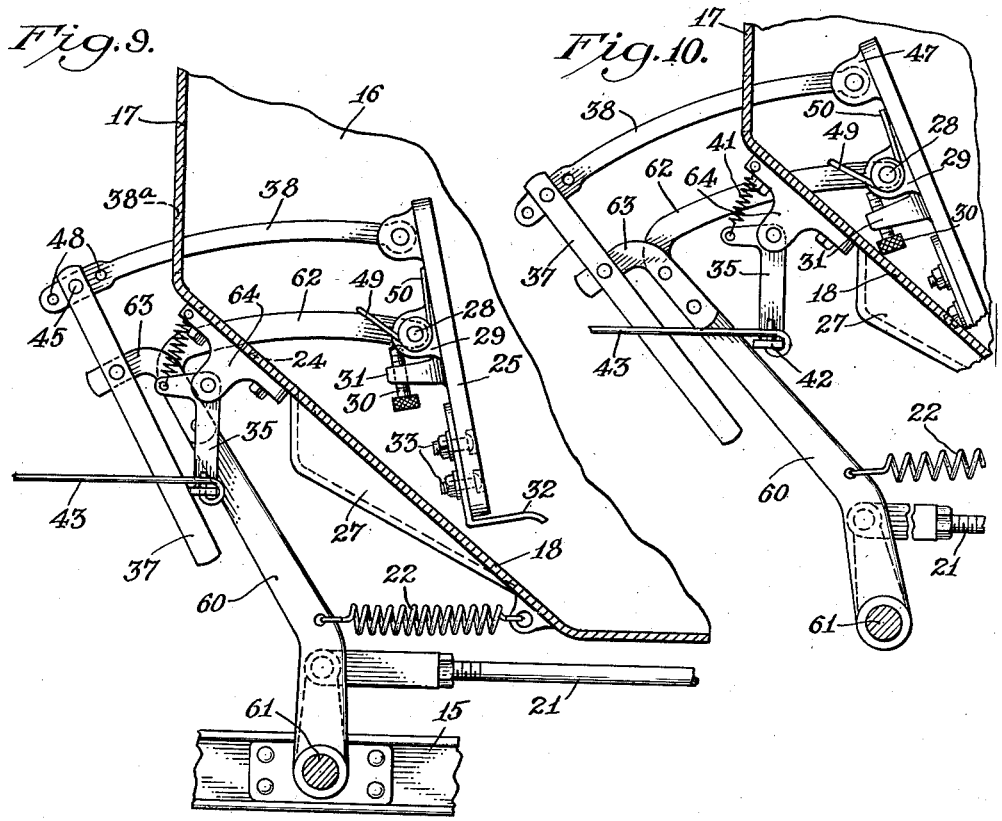
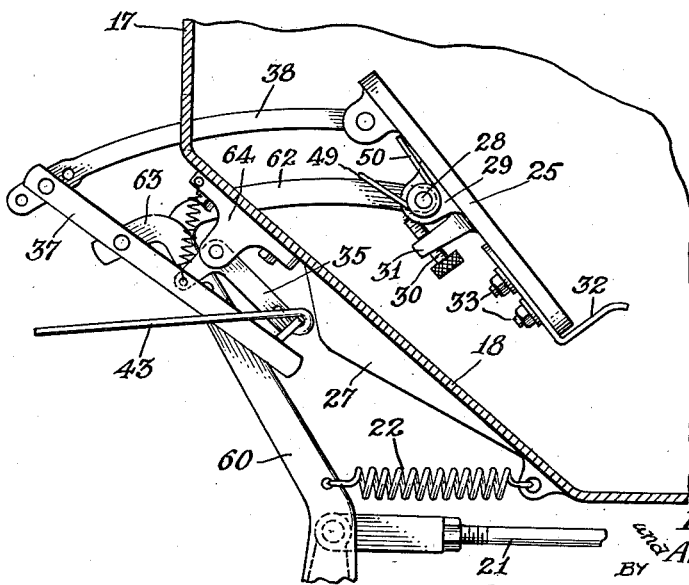
Inventors
Lubo Polonec
and Anders K. Andersen
BY Parker, Carlson, Pitzner & Hubbard
Attorneys.

Patented June 3, 1941

2,244,116

UNITED STATES PATENT OFFICE 2,244,116

COMBINED BRAKE AND ACCELERATOR CONTROLLING MEANS FOR AUTOMOTIVE VEHICLES

Lubo Polonec and Anders K. Andersen, Chicago, Ill.

Application November 7, 1939, Serial No. 303,240

11 Claims. (Cl. 192—3)

This invention relates to improvements in combined brake and accelerator controlling means for automotive vehicles and more particularly concerns means employing a single member such as a foot operated pedal to serve both as an accelerator pedal and as a brake pedal.

A general object of the invention is to provide combined brake and accelerator controlling means which requires no different operating actions or motions by the driver of an automotive vehicle than are required with the conventional arrangements of independently controlled accelerator and brake mechanisms; but which actually reduces the motions required by relieving the driver of the time consuming and accident provoking movements incident to transference of the operating foot from an accelerator pedal to a separate brake pedal, and renders the transition from acceleration to braking merely a single operating reflex, namely, a forward pedal depressing motion of the foot that follows logically and naturally generally the same direction as the pedal-depressing foot action for acceleration.

Another object of the invention is to provide means of this general character by which the driver can operate the accelerator or apply the brake without in anywise shifting his foot upon or from a single foot pedal, and deceleration is effected automatically as an incident to the braking action.

Still another object of the invention is to provide combined brake and accelerator controlling means having but a single operating pedal and so constructed and arranged that involuntary application or "riding" of the brake from the weight of the driver's foot upon the pedal or from the foot pressure required for acceleration is entirely avoided although the foot rests naturally and comfortably upon the pedal while driving.

A further object of the invention is to provide combined brake and accelerator controlling means adapted for ready adjustability to meet various driving conditions and to accommodate the driver's convenience.

Yet another object of the invention resides in the provision of combined brake and accelerator controlling means of the foregoing general character which is adapted for installation in the usual or preferred vehicle constructions without material alterations or rearrangements of the latter.

A still further object of the invention is to provide efficiently operating combined brake and accelerator controlling means of inexpensive construction requiring only a small number of relatively simple and easily made parts which will remain permanently in any preferred condition of operating adjustment.

Other objects and advantages will become apparent in the following description and from the accompanying drawings in which:

Fig. 3 is a view taken in the same plane as Figs. 1 and 2 but showing the relationship of the parts when the brake is applied.

Fig. 4 is a sectional view taken substantially in the plane of line 4—4 of Fig. 1 to show the underside of the brake and accelerator foot pedal.

Fig. 5 is a fragmentary elevational view, partly in section, taken substantially in the plane of line 5—5 of Fig. 1 to show certain details of the brake-operating and accelerator mechanisms.

Fig. 6 is a fragmentary sectional elevational view taken substantially in the plane of line 6—6 of Fig. 1 to show details of the fulcrum lock means.

Fig. 7 is a fragmentary sectional elevational view taken substantially in the plane of line 7—7 of Fig. 5 to show details of the connection between the parts of the brake arm.

Fig. 8 is an enlarged fragmentary longitudinal sectional view through the brake and accelerator pedal taken substantially in the plane of line 8—8 of Fig. 4.

Fig. 9 is a fragmentary longitudinal vertical sectional view through an automotive vehicle showing a modified form of the invention.

Fig. 10 is a view taken in substantially the same plane as Fig. 9 showing the relationship of parts of the modified form when the brake is applied.

Fig. 11 is a view taken in the same plane as Figs. 9 and 10 showing the relationship of parts of the modified form during acceleration.

Figure 1:
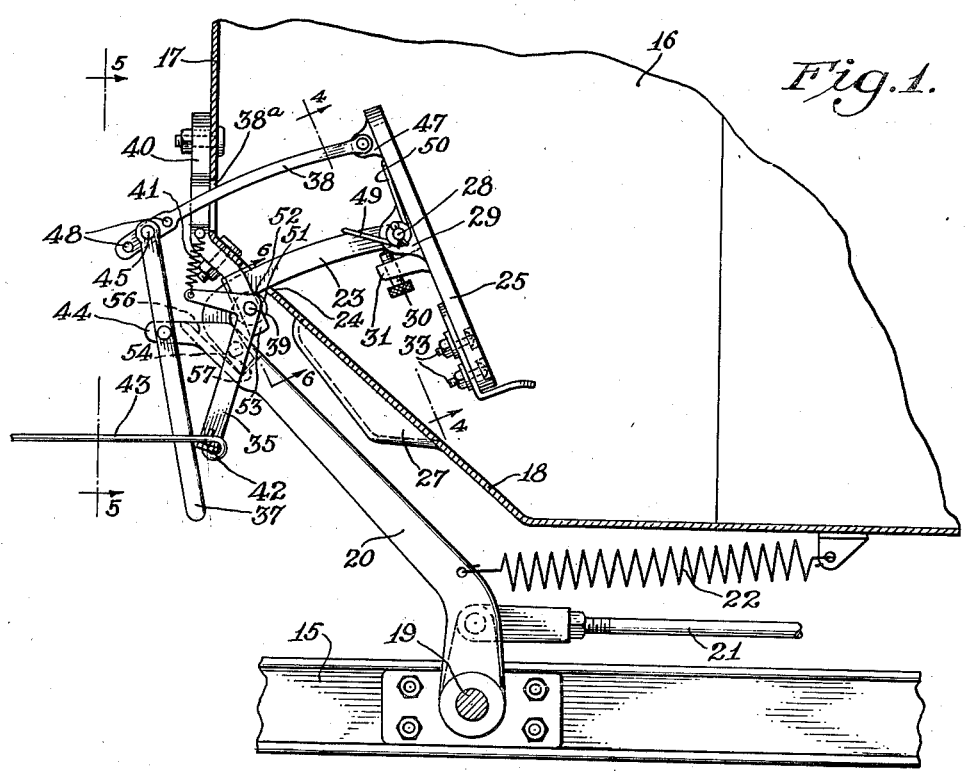
Figure 1 is a fragmentary longitudinal vertical sectional view through an automotive vehicle structure showing combined brake and accelerator controlling means embodying the features of the invention.

While the invention is susceptible of various modifications and alternative constructions, we have shown in the drawings and will herein describe in detail, certain preferred embodiments, but it is to be understood that we do not thereby intend to limit the invention to the specific forms disclosed, but intend to cover all modifications and alternative constructions falling within the spirit and scope of the invention as expressed in the appended claims.

In carrying out the present invention, the brake pedal of the selected automotive vehicle is so arranged with respect to the driver's seat and the floor board of the tonneau that the driver may conveniently and comfortably keep his foot on the pedal constantly while driving. For braking, the pedal is adapted to be depressed in the usual way. In addition to its brake-applying functions, however, the pedal also serves as an accelerator pedal, being adjustably pivoted upon the brake arm so as to be tiltable forwardly to actuate the accelerator mechanism with a movement substantially like that customarily employed in actuating a separate accelerator pedal. The accelerator mechanism preferably comprises separable cooperative units, one constituting throttle operating means mounted independently of the brake arm, and the other constituting actuating means mounted upon the brake arm for acting upon the throttle-operating means while the brake is released. Thus, movement of the brake arm from neutral or released position toward braking position may serve positively to separate the cooperative units of the accelerator mechanism so as to assure deceleration coordinated with braking of the vehicle. Moreover, while the foot pedal is in use solely for acceleration purposes, the driver's foot may rest normally in place thereon without muscular restraint because provision is made to avoid involuntary application or "riding" of the brake arising either from the weight of the foot or the relatively light toe pressure which must be applied in tilting the pedal for acceleration.

Referring now to the drawings, only those fragmentary parts of an automotive vehicle are shown more or less schematically which are immediately associated with the combined brake and accelerator controlling mechanisms, namely, a portion of a chassis frame bar 15 and the overlying portion of a tonneau 16 including a front wall section 17 and a floor board section 18 at least a portion of which may slant forwardly toward the front wall section. Pivotally connected to the frame bar 15 as by means of a rock shaft 19 is a brake arm 20 which is adapted to actuate an operating member such as a rod 21 for any preferred form of mechanical or pressure fluid operated brake. For retaining the brake arm yieldably in a neutral or non-braking position, suitable means such as a contractile spring 22 may be connected to the brake arm 20 and the tonneau 16.

The brake arm 20 may extend upwardly generally parallel with the slanting portion of the floor board section 18 and has a rearwardly projecting upper end portion or head 23 which extends through an aperture 24 toward the interior of the tonneau, preferably on an operating arc concentric with the rock shaft 19. At its inner end the brake arm head 23 carries a foot pedal 25, and the arrangement may be such that in the neutral or non-braking position the foot pedal will lie as close as practicable to the slanting portion of the floor board section 18 to conserve space and to reduce the distance to which the driver must raise his foot to reach the pedal. A pocket 27 may be formed in the floor board section to provide a recess for accommodating the heel end of the pedal 25 when the latter is depressed in applying the brake (Fig. 3).

In order to enable use of the pedal 25 for acceleration, it is preferably pivotally connected to the brake arm head 23 by suitable means such as a pin 28 (Figs. 1, 4 and 8) extending through the end portion of the head and a pair of parallel connecting ears 29 on the pedal. The ears 29 are located in any preferred position on the under face of the pedal 25 that will suit particular requirements or preferences, the principal consideration being, of course, to permit the pedal to be easily and comfortably tilted forwardly by toe-applied pressure. The preferred angle of the pedal 25 in non-tilted position may be adjustably controlled by means such as an adjustment screw 30 threaded through a lug 31 rearwardly of the ears 29 so that the end of the screw will engage the adjacent end portion of the brake arm head 23. Convenient adjustments in the length of the foot pedal may be effected by means of an angular heel plate 32 which may be longitudinally shiftably connected to the pedal through the medium of bolts 33 extending through a longitudinal slot 34.

Tilting movement of the foot pedal 25 forwardly about its pivotal axis while the brake mechanism is in neutral position is utilized to operate suitable accelerator mechanism. In the present instance the latter mechanism comprises a throttle controlling member 35 adapted to be actuated by means including a striker 37 and a connecting link 38 between the striker and the foot pedal passing through an aperture 38ª in the front wall 17 (Figs. 1 and 5). The throttle controlling member 35 may be in the form of a bell crank lever swingable in a vertical plane and pivotally connected pendantly as by means of a pin 39 to the lower end of an elongated bracket 40 which may be suitably secured to the front wall 17 and the upper portion of the floor board section 18 adjacent to the brake arm 20. The short arm of the bell crank 35 extends forwardly and is preferably connected to a suitably anchored expansile tension spring 41 which normally holds the throttle-controlling member in a neutral or decelerating position. The long arm of the controlling member 35 extends downwardly and has a laterally projecting engagement or striking finger 42 thereon for engagement by the striker 37 and for connection with the end of a throttle rod 43 which is connected at its other end to the throttle valve (not shown) of the vehicle.

Figure 2:
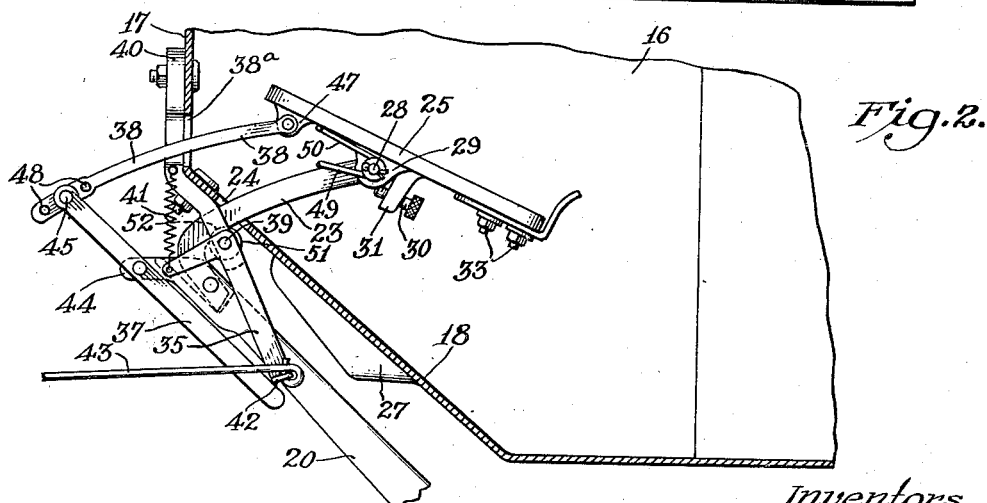
Fig. 2 is a view taken in substantially the same plane as Fig. 1 showing the relationships of the parts during acceleration.

As shown, the striker 37 may consist of a simple bar lever intermediately pivotally connected for swinging movement in a vertical plane to a supporting finger 44 which for this purpose projects rigidly forwardly from the brake arm 20 (Figs. 1, 2, 3 and 7). The lower section of the striker bar 37 is adapted to separably engage the striking finger 42 and is of such length that in swinging the striker about its pivotal axis counterclockwise as seen in Figs. 1 and 2, the throttle operator 35 can be actuated to full acceleration position in opposition to the tension spring 41. The upper section of the striker bar 37 is pivotally connected as by means of a removable pin 45 (Fig. 5) to the forward end of the connecting link 38 which, in turn, is pivotally connected at its rear end to the upper end portion of the pedal 25 as by means of a pin passing through a suitable lug or ear 47 on the pedal. By preference the link 38 is of arcuate shape similarly as the brake arm head 23. A longitudinally spaced series of pin apertures 48 in the forward end portion of the connecting link 38 enables appropriate adjustment of the connection with the striker bar 37 as, for example, when the angle of the pedal 25 is readjusted.

In operation, to effect the desired degree of acceleration the pedal 25 is tilted to drive the link 38 forwardly while the brake operating mechanism is in the neutral or non-braking position, whereby to swing the striker 37 counterclockwise as seen in Fig. 2 and actuate the throttle operating member 35. When it becomes necessary to apply the brake, the pedal 25 is depressed to move the brake arm 20 forwardly, and because the striker 37 is supported thereby it will also be carried forwardly to release the throttle operating member 35 (Fig. 3) and automatically effect deceleration, even though the driver may still have the foot pedal 25 tilted forwardly in acceleration position. Thus, the transition from acceleration to braking may be effected instantaneously in response to a single reflex movement on the part of the driver, namely, a forward push on the pedal 25 for braking purposes. The value of this arrangement in emergencies can be readily appreciated.

For driving in hilly or mountainous country acceleration coincident with release of the brake is desirable to avoid backsliding. Therefore, the striker 37 and the connecting link 38 may be relatively adjusted by shifting the connecting pin 45 in the pin apertures 48 to permit at least partial acceleration by forward tilting of the pedal 25 while the brake is still holding. Thus, a smooth transition may be effected from the condition wherein the brakes hold the vehicle against backsliding to where the motor takes hold for propulsion thereof up an incline.

As an aid in releasing the acceleration mechanism, the pedal 25 may be equipped with resilient means for automatically returning the same from the forwardly tilted acceleration position. A suitable spring 49 (Figs. 1, 4 and 8) may be provided for this purpose comprising a yoke engaging the upper face of the brake arm head 23 and having opposite substantially parallel legs 50 intermediately coaxially looped to receive the opposite end portions of the pivot pin 28 while the end portions of the legs bear against the back face of the upper end portion of the pedal for urging the pedal toward non-tilted position.

Inasmuch as the driver of the vehicle is compelled, by the present arrangement, to keep his foot almost constantly upon the single pedal 25 while driving, means may be provided for avoiding involuntary application or riding of the brake which might result from the weight of the driver's foot or from the tilting pressure applied to the pedal while accelerating and cause a drag detrimental both to the brakes and to the motor. Of course, the brake neutralizing spring 22 might be furnished strong enough to overcome the tendency toward such brake drag, but to work against such a powerful spring to apply the brakes might require greater force than desirable under various circumstances. Herein a practical, efficient expedient for the purpose comprises a fulcrum lock including a member 51 (Figs. 1, 5 and 6) such as an antifriction roller which in the neutral position of the brake arm 20 is adapted to be received in a suitable shallow recess or notch 52 (Figs. 1 and 7) on the under face of the brake arm head 23 adjacent to the juncture with the brake arm body. The roller 51 may conveniently be supported rotatably by the pin 39 within a suitable bifurcation 53 formed at the lower end of the bracket 40 and in such registration with the floor board aperture 24 that the arm head 23 can freely ride the roller.

To permit slight vertical movement or play of the brake arm head 23 for receiving the roller 51 in the recess 52 or for releasing the same therefrom a pivotal connection with the main body of the brake arm 20 is effected by providing the head member with a toe piece 54 (Fig. 7) which is pivotally connected within a suitably recessed enlargement or head 55 upon the upper end of the brake arm body. Upon relatively slight forward pivotal movement of the brake arm head 23 for applying the brake, the inner portion of the toe piece 54 engages an abutment wall 56 and an opposed shoulder 57 within the recessed head 55 to effect a solid releasable connection with the body of the brake arm (broken line position of Fig. 7). In the neutral position of the brake arm the dead weight of the driver's foot in addition to the weight of the foot pedal 25 and the brake arm head 23 is effective to maintain the roller 51 firmly seated in the notch 52 whereby substantially to lock the brake arm against braking movement until the pedal 25 is positively pushed to drive the brake arm head 23 forwardly and release the roller from the locking notch. To avoid catching or excessive gripping which might unduly retard application of the brake and to assure smooth, easy operation, the approach edge of the notch 52 should be formed as moderately as practicable.

The fulcrum lock arrangement is particularly advantageous where, as shown in Fig. 1, the axis of the rock shaft 19 is located substantially rearwardly of a vertical plane passing through the center of weight of the foot pedal 25, with the result that the normal tendency of the weight of the driver's foot or acceleration pressure on the pedal might tend to swing the brake arm in opposition to the spring 22 and partially apply the brakes.

However, where an arrangement is provided with the pivotal axis of the brake arm located forwardly of the center of weight through the foot pedal, as shown in the modified arrangement of Figs. 9 to 11, inclusive, the dead weight of the driver's foot upon the brake pedal may result in a positive overbalance tending to move the brake arm toward non-braking rather than braking position. In this case it is not necessary to employ an expedient such as the fulcrum lock, which has been described, for retaining the brake mechanism in neutral position during acceleration. Accordingly, a brake arm 60 is mounted upon a rock shaft 61 having its axis located substantially forwardly of the center of weight of the brake pedal 25 which in the present instance is mounted upon an arcuate brake arm head 62 formed rigidly with the brake arm. In this construction a bracket 63 is secured to the brake arm to provide a supporting finger for the striker 37, and the throttle actuating member 35 is pivotally supported by an ear bracket 64 which may be secured to the slanting portion of the floor board 18.

The foot pedal and accelerator mechanism may be substantially identical in form and operation with the embodiment of the invention described in connection with Figs. 1 to 3 and need not, therefore, be again described in detail. Operation of the modified form of the invention is also substantially the same, acceleration being effected only when the brake mechanism is in neutral position by tilting the brake pedal 25 as shown in Fig. 11. When the brake is applied, as shown in Fig. 10, the accelerator mechanism is preferably positively released by having the striker 37 carried by the brake arm out of engagement with the throttle controlling member 35.

From the foregoing it will be apparent that the present invention provides improved combined brake and accelerator mechanisms wherein deceleration occurs naturally and certainly as an incident to application of the brake by means of the single foot pedal that serves the dual functions of a brake and an accelerator operating medium. The unique arrangement whereby one unit of the accelerator mechanism is mounted on the brake arm while another cooperative unit is mounted independently of the arm effectuates this result because in this manner the units are positively separated by the braking action. An important advantage of the invention resides in the fact that the operating reflexes required of the driver are no different from those employed in the conventional two-pedal arrangements but are actually simplified by elimination of the motions necessitated in the conventional forms in transferring the foot from the accelerator pedal to the braking pedal or return. Furthermore, unintentional partial application or dragging of the brake is avoided although the operator may have to rest his foot upon the single brake and accelerator pedal constantly while driving. The construction is uncomplicated, easily understood and will remain permanently in the preferred condition of adjustment.

We claim as our invention:

1. Apparatus of the character described comprising, in combination, a brake arm, a brake pedal carried upon said arm, and means for avoiding unintentional application of the brake by the dead weight of the driver's foot resting upon said pedal, said means being arranged to become increasingly effective to avoid such application of the brake in proportion to any increase in the dead weight upon the pedal.

2. Apparatus of the character described comprising, in combination, a generally upright brake arm, an elongated head member projecting laterally therefrom, a foot pedal mounted upon said head member, and fulcrum locking means cooperative with said head member to restrain brake applying movement thereof under the influence of weight bearing downwardly against said pedal but being instantaneously releasable by longitudinally applied braking force applied through said pedal, said locking means being arranged to resist brake applying movement increasingly as the downward weight increases.

3. In an automotive vehicle, in combination a pivoted brake arm body extending upwardly and forwardly, an elongated head element pivotally connected to the upper end of said brake arm body and extending rearwardly therefrom, a foot pedal mounted upon the rear end of said head and having the center of weight therethrough located forwardly of the pivotal axis of said brake arm body, an antifriction roller mounted to support said head for movement thereover and adapted to serve as a fulcrum adjacent to the pivoted end of said head in the neutral position of the brake arm, and a retaining recess at the fulcrum point of said head for receiving said roller to hold the head against brake applying movement when weight is applied along the vertical center of weight of said pedal but being instantly releasable when brake applying pressure is applied longitudinally of said head.

4. Apparatus of the character described comprising, in combination, a generally upright brake arm pivotally supported at its lower end and having a head portion projecting rearwardly therefrom to a point beyond a vertical plane through the pivotal axis of the arm, a foot pedal movably mounted upon the rear of said head portion and having the center of weight thereof located rearwardly of said plane in the neutral or non-braking position of said arm, and accelerator mechanism controlled by movement of said foot pedal relative to said brake arm, the location of said foot pedal relative to said plane tending to effect a rearward overbalance of said brake arm in the non-braking position thereof adapted to be supplemented by the weight of the driver's foot so as to avoid involuntary application of the brake when moving said pedal solely for controlling said accelerator mechanism.

5. Brake and accelerator controlling means for automotive vehicles comprising, in combination, a brake arm having a head movably connected to and extending rearwardly from the main portion of the arm, a foot pedal movably mounted on said head, accelerator mechanism including a striker mounted upon the main portion of said arm and an engagement member mounted independently of said arm, said striker having a connection with said pedal for acceleration by movement of said foot pedal for solely acceleration purposes but arranged to become inactive by movement of said arm toward braking position, and means cooperative with said head constructed and arranged to become effective to maintain said brake arm against movement toward braking position under the influence of the weight of said head and the dead weight of the operator's foot upon said foot pedal so that there will be freedom from braking movement of said head when the foot pedal is moved solely for acceleration purposes, said means being substantially free from restraint upon braking movement of said brake arm and permitting release of said head therefrom by slight movement of said head relative to the main portion of the brake arm when the dead weight of the foot is removed from said pedal and force is applied to the latter in the brake applying direction.

6. Brake and accelerator controlling means for automotive vehicles comprising, in combination, a brake arm extending generally upwardly and having a head extending rearwardly from the upper end thereof, a foot pedal movably mounted upon the rear end of said head, accelerator mechanism including a striker mounted upon the generally upright main portion of said arm and an engagement member mounted independently of said arm, a lever extending in generally the same direction as said head connected with said pedal and said striker for actuating the latter in response to movement of said pedal for acceleration purposes, said striker and said engagement member being arranged to become inactive by movement of said brake arm toward braking position, means constructed and arranged to maintain said brake arm against movement toward braking position under the influence of the weight of said head and the dead weight of the operator's foot upon the foot pedal whereby complete freedom from braking movement is assured regardless of the downward weight imposed upon said pedal but permitting free movement of the foot pedal for actuating said accelerator mechanism and by removal of the downward weight permitting application of the brake in response to ordinary braking force applied forwardly to said head.

7. In combination in apparatus of the character described, a brake arm having a head mounted for movement relative to the main portion of said arm, a foot pedal movably mounted on said head, and means cooperating with said head in the non-braking position of said arm to lock said head against braking movement in response to any force except a positive pressure applied in one predetermined direction so that the operator's foot may rest freely on said pedal, said means being arranged to release said head upon the application to said pedal of pressure in said one direction and movement of the head relative to said main portion of the arm out of engagement with said means.

8. In combination in combined brake and accelerator controlling means for automotive vehicles, a brake arm including a generally upright main portion and a rearwardly extending head, said head and main portion being connected for relative movement, means on said head for supporting the operator's foot, means cooperating with said head for locking the brake arm against movement toward braking position in response to downward weight upon said head as from the dead weight of the operator's foot resting thereon but permitting release of said head in response to braking force applied forwardly and movement of said head out of locking engagement, and means on said main portion for limiting the relative movement of said head and main portion for effecting a substantially solid braking relationship between said head and said main portion in response to said braking force.

9. In combination in combined brake and accelerator controlling means for automotive vehicles, a brake arm including a main portion extending in one direction and a head extending therefrom in another direction, and means cooperative with said head adjacent to the point where the head joins said main portion forming a fulcrum lock to hold the brake arm against braking movement in response to force other than braking force applied in a predetermined direction, said head and means being releasable as an incident to the application of braking force to said head.

10. Apparatus of the character described comprising, in combination, a brake arm, a brake pedal carried on said arm, and means for avoiding unintentional brake applying movement of said brake arm by the dead weight of a driver's foot resting upon said pedal, said means being arranged to become increasingly effective to avoid such movement in proportion to any increase in the dead weight upon the pedal, said means being substantially free from restraint upon braking movement of said brake arm upon application of a force in brake applying direction.

11. In apparatus of the character described, a brake arm having a head mounted for movement relative to said arm, a foot pedal movably mounted on said head, and means cooperating with said head in the non-braking position of said arm to lock said head against braking movement in response to a downward force so that the operator's foot may rest freely on said pedal, said means being arranged to release said head upon the application to said pedal of pressure in a brake applying direction and movement of said head relative to said arm out of engagement with said means.

LUBO POLONEC.
ANDERS K. ANDERSEN.